US006938195B1

(12) United States Patent
Shi et al.

(10) Patent No.: US 6,938,195 B1
(45) Date of Patent: Aug. 30, 2005

(54) COMMUNICATION TERMINAL APPARATUS, BASE STATION, AND METHOD OF RADIO COMMUNICATION (75) Inventors: Guizeng Shi, Akishima (JP); Osamu Kato, Yokosuka (JP); Mitsuru Uesugi, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/701,309

(22) PCT Filed: Mar. 23, 2000

(86) PCT No.: PCT/JP00/01754

§ 371 (c)(1),
(2), (4) Date: Mar. 26, 2001

(87) PCT Pub. No.: WO00/60798

PCT Pub. Date: Oct. 12, 2000

(Under 37 CFR 1.47)

(30) Foreign Application Priority Data

Mar. 31, 1999 (JP) .......................................... 11-094351
Apr. 9, 1999 (JP) .......................................... 11-102734

(51) Int. Cl.[7] .............................................. H04L 1/18
(52) U.S. Cl. ..................................................... 714/748
(58) Field of Search ................................ 714/748, 746, 714/750

(56) References Cited

U.S. PATENT DOCUMENTS

| 5,629,948 | A | * | 5/1997 | Hagiwara et al. ........... 714/748 |
| 5,867,510 | A | * | 2/1999 | Steele ......................... 714/758 |
| 5,968,197 | A | * | 10/1999 | Doiron ....................... 714/748 |
| 6,134,694 | A | * | 10/2000 | Uebayashi et al. ......... 714/751 |
| 6,157,628 | A | * | 12/2000 | Uebayashi et al. ......... 370/335 |
| 6,161,207 | A | * | 12/2000 | Lockhart et al. ............ 714/758 |
| 6,275,966 | B1 | * | 8/2001 | Sitterley ..................... 714/782 |
| 6,320,852 | B1 | * | 11/2001 | Obuchi et al. .............. 370/328 |

FOREIGN PATENT DOCUMENTS

| JP | 60090448 | 5/1985 | |
| JP | 63318838 | 12/1988 | |
| JP | 1163101 | 6/1989 | .......... A01N/33/08 |
| JP | 3074946 | 3/1991 | |
| JP | 7067175 | 3/1995 | |
| JP | 8163101 | 6/1996 | |
| JP | 9186740 | 7/1997 | |
| JP | 9224051 | 8/1997 | .......... H04L/12/56 |
| JP | 9284261 | 10/1997 | |

OTHER PUBLICATIONS

PCT International Search Report dated Jun. 13, 2000.

* cited by examiner

*Primary Examiner*—A. Decady
*Assistant Examiner*—Esaw Abraham
(74) *Attorney, Agent, or Firm*—Stevens, Davis, Miller & Mosher, LLP (57) ABSTRACT

A communication terminal apparatus returns a unit of transmission with an error detected. A base station apparatus generates information indicating a position of an error within the unit of transmission while comparing a unit of transmission returned from the communication terminal apparatus with a corresponding unit of transmission stored in a buffer previous to transmission of the unit of transmission. The base station apparatus transmits the generated information to the communication terminal apparatus. The communication terminal apparatus corrects the error of the unit of transmission on the basis of the information.

5 Claims, 11 Drawing Sheets

COMMUNICATION TERMINAL APPARATUS, BASE STATION, AND METHOD OF RADIO COMMUNICATION

TECHNICAL FIELD

The present invention relates to a communication terminal apparatus, a base station apparatus and a radio communication method.

BACKGROUND ART

A conventional ARQ (Automatic Repeat reQuest) system has three well known systems of "Stop and Wait ARQ (SW-ARQ)", "Go back N ARQ (GBN-ARQ)" and "Selective Repeat ARQ (SR-ARQ). These three systems have merits that a simple decoder can be employed therein in comparison with an error correction system and high reliability can be obtained and so forth.

Figure 1:
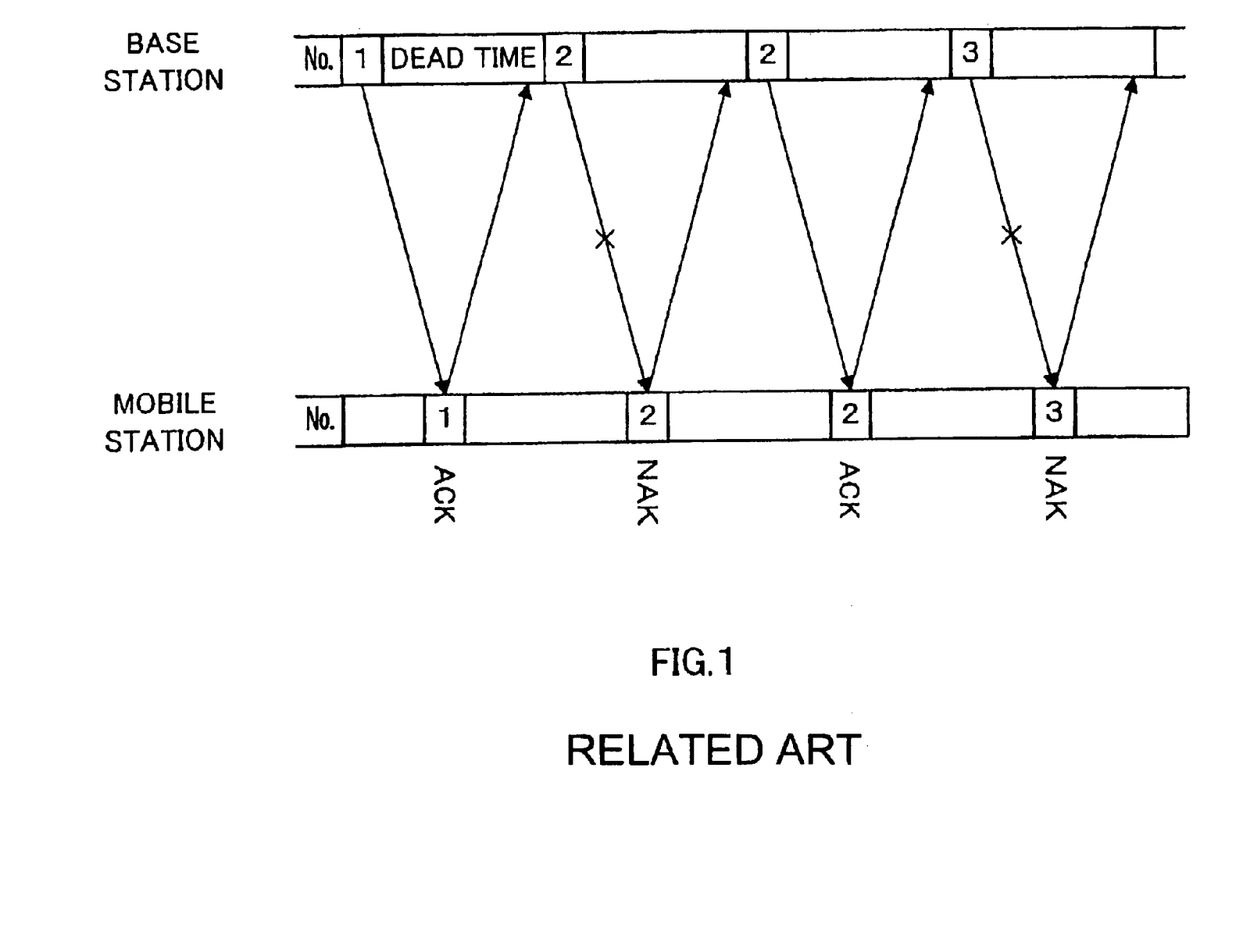
FIG. 1 is a sequence view for explaining operation of "Stop and Wait ARQ" of a conventional system.

In the first place, operation of "SW-ARQW" system is described while employing FIG. 1. A base station transmits one cell (or one packet) to a mobile station. The mobile station checks whether or not an error occurs about the cell in a transmission network. In the case of no error, the mobile station transmits an acknowledge signal (ACK) to the base station while employing a returning channel to inform that the mobile station has received data correctly. While in the case where the mobile station has detected the error, the mobile station transmits a retransmission request signal (NAK; Negative AcKnowledge) of the cell to the base station while canceling the cell with the error. When the base station receives the NAK, the base station retransmits data that is stored in a transmission buffer to the mobile station. Further, the retransmission is continued until the ACK is returned from the mobile station. Thus, since procedure of the "SW-ARQ" system is simple, the "SW-ARQ" system is employed widely for many data transmission.

Figure 2:
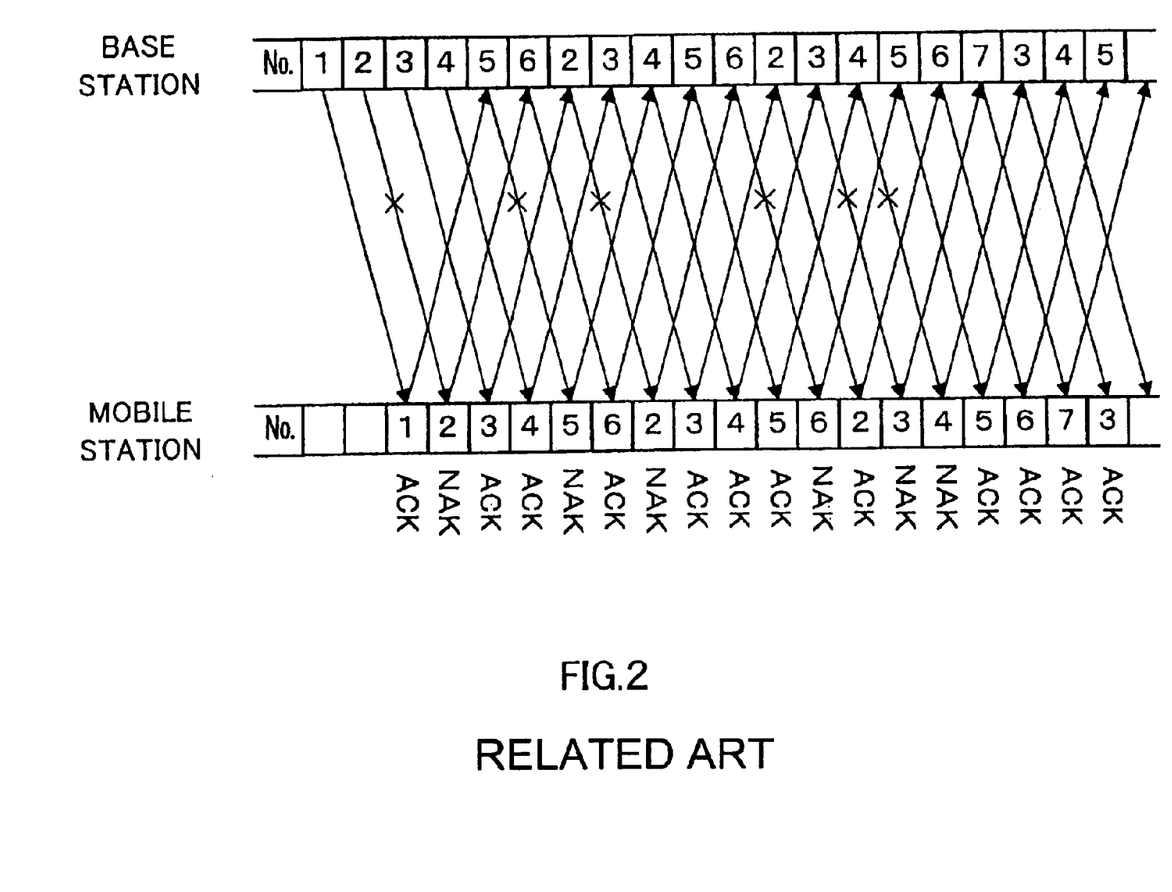
FIG. 2 is a sequence view for explaining operation of "Go back N ARQ" of a conventional system.

Further, in the "GBN-ARQ" system, the base station transmits the cell continuously. Then, the base station, as illustrated in FIG. 2, transmits a next cell without waiting a response signal from the mobile station about the cell. Consequently, the base station results in transmitted plural cells until the base station receives the response signal from the mobile station. In an example of FIG. 2, the base station transmits the cells of NO. 1 to NO. 5 until the base station receives the NAK from the mobile station. Further, when the base station receives the NAK from the mobile station, the base station retransmits from a cell (NO. 2 cell) with an error to a cell (NO. 6 cell) which is transmitted in a timing when the NAK is received to the mobile station while going back to a cell corresponding to the NAK stored in the transmitting buffer. The mobile station cancels the cells from NO. 2 to NO. 6 received previously, because the cells NO. 2 to NO. 6 are retransmitted from the base station.

Figure 3:
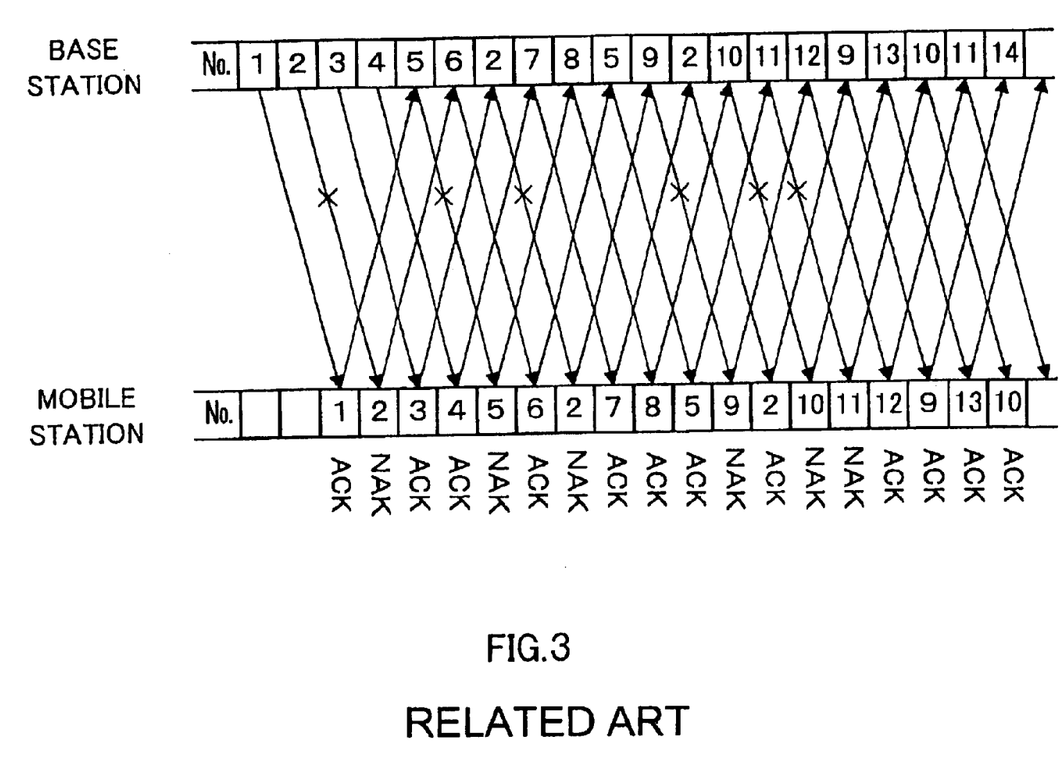
FIG. 3 is a sequence view for explaining operation of "Selective Repeat ARQ" of a conventional system.

Moreover, concerning the SR-ARQ system, likewise the GBN-ARQ system, the base station transmits the cell continuously. However, in this system, as illustrated in FIG. 3, the base station retransmits only the cell with occurrence of an error to the mobile station. The SR-ARQ system is one whose transmission efficiency is the most excellent among the above-described three ARQ systems.

Here, in an asymmetrical data transmission, there is a problem that load of a forward channel from the base station to the mobile station becomes large in comparison with a load of a reverse channel from the mobile station to the base station.

In the above-described conventional ARQ system, since retransmission of information data with occurrence of an error in reverse/forward channel is performed while employing the same reverse/forward channel, a problem that load of the forward channel is large in comparison with a load of the reverse channel is not solved.

DISCLOSURE OF INVENTION

An object of the present invention is to provide a communication terminal apparatus, a base station apparatus and a radio communication method capable of performing asymmetrical data transmission with excellent efficiency while alleviating the load of the forward channel with the large load assigned.

In order to achieve the above-described object, in the present invention, in the case where an error occurs during data transmission in the forward channel, the mobile station returns a received cell as it is while employing the reverse channel. Subsequently, the base station detects an occurrence position of the error while comparing the returned cell with a stored corresponding transmitting cell, followed by informing information indicating the occurrence position of the detected error to the mobile station. Then, the mobile station corrects error data received previously on the basis of the error information.

Namely, in the present invention, since retransmission of the error data that is performed in the forward channel with large load assigned is shifted to the reverse channel, transmission efficiency of asymmetrical data transmission is enhanced.

BEST MODE FOR CARRYING OUT THE INVENTION

Embodiments of the present invention are described in detail below with reference to accompanying drawings.

Embodiment 1

Figure 4:
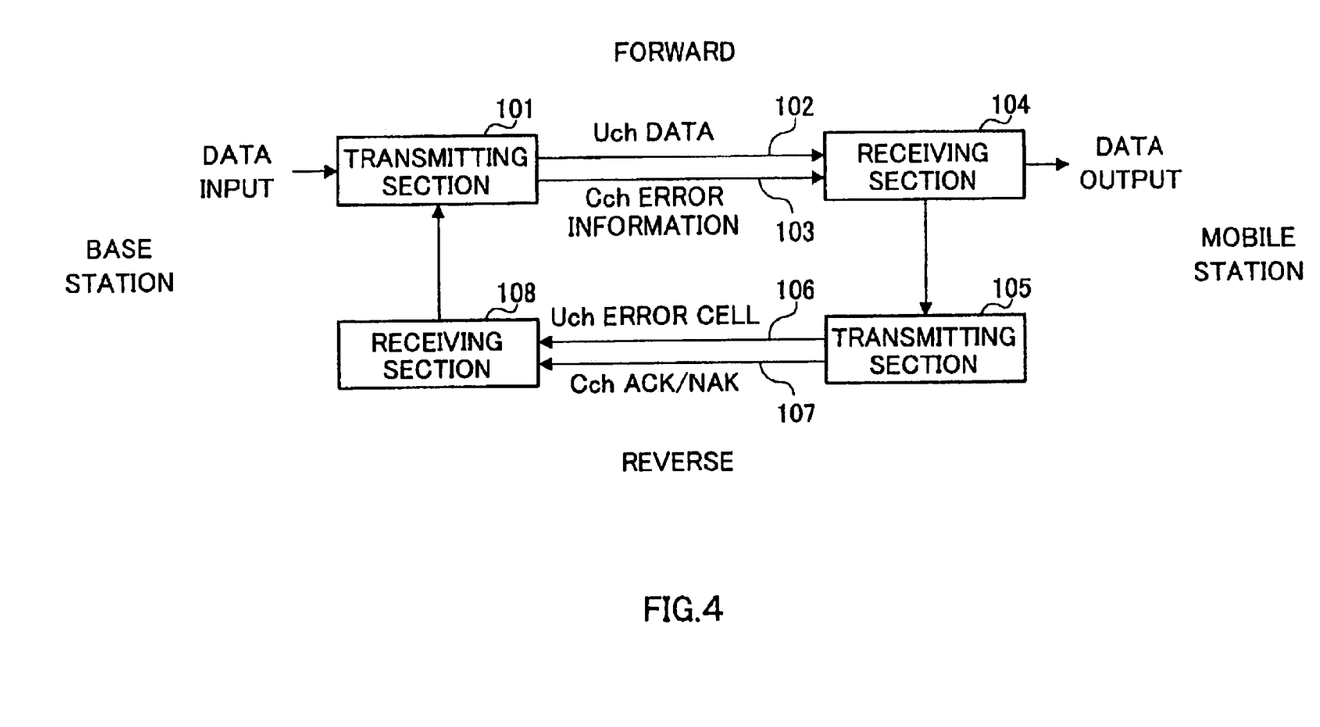
FIG. 4 is a configuration view of a radio communication system according to an embodiment 1 of the present invention.

FIG. 4 is a configuration view of a radio communication system according to an embodiment 1 of the present invention. In FIG. 4, 101 is a transmitting section of a base station side, 102 is a forward user channel (forward Uch), 103 is a forward control channel (forward Cch), 104 is a receiving section of a mobile station side, 105 is a transmitting section of the mobile station side, which performs returning of a cell with an error (hereinafter referred to as error cell) and transmission of ACK/NAK signal, 106 is reverse user channel (reverse Uch), 107 is a reverse control channel (reverse Cch) and 108 is a receiving section of the base station side.

In the base station which is a transmitting side, a cell is inputted to the transmitting section 101. A CRC (Cyclic Redundancy Check) bit is added to the cell by the transmitting section 101. Subsequently, the cell is transmitted to the mobile station while employing the forward Uch.

Further, the cell is received by the receiving section 104 of the mobile station. The CRC is performed to the received cell by the receiving section 104. Then, in the case of no error, the cell is transferred to a next processing section which is not illustrated by the receiving section 104. On the other hand, in the case where an error occurs on the cell, the cell is transferred to the transmitting section 105 by the receiving section 104, before being returned to the base station as it is by the transmitting section 105 while employing the reverse Uch.

In the base station, the receiving section 108 receives an error cell returned from the mobile station. Further, the receiving section 108 detects occurrence position of the error while comparing the received error cell with a corresponding transmitting cell which is stored. Then, the receiving section 108 outputs information (hereinafter referred to as error information) indicating the occurrence position of the error. Further, the transmitting section 101 transmits the error information to the mobile station while employing the forward Cch. Furthermore, in the case where error occurs on data received by the receiving section 108, the transmitting section 101 requires retransmission to the mobile station while employing the NAK signal.

In the mobile station, the receiving section 104 receives the error information transmitted from the base station. Further, in the case where the error information is received correctly, the receiving section 104 corrects the error data received previously on the basis of a position of an error bit indicated by the error information. On the other hand, in the case where the error information is received incorrectly, the transmitting section 105 requires retransmission of the error information to the base station while employing the NAK signal. Furthermore, concerning transmission of reverse data to the base station from the mobile station, the SR-ARQ system and so forth which are different from the above-described method is adopted.

Figure 5A:
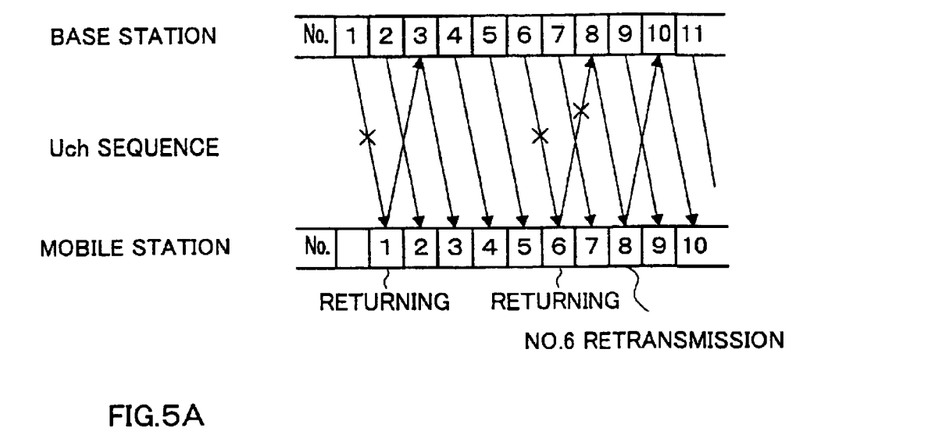
FIG. 5A is a sequence view for explaining operation of a base station and a mobile station according to the embodiment 1 of the present invention.
Figure 5B:
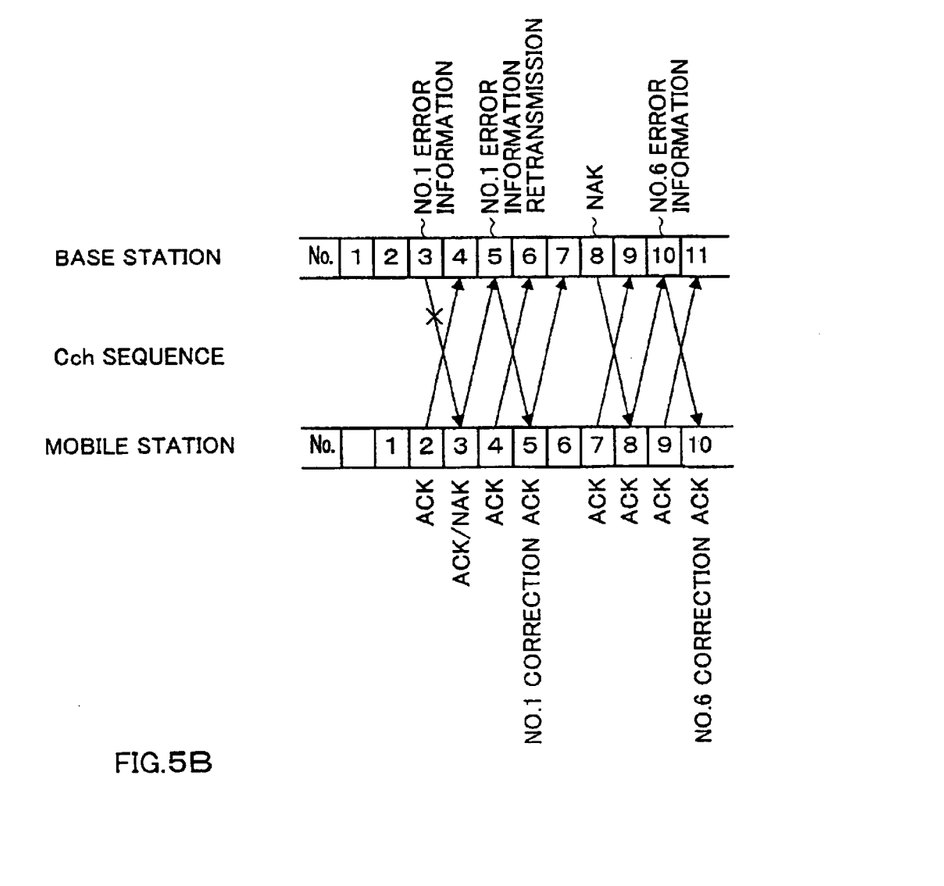
FIG. 5B is a sequence view for explaining operation of a base station and a mobile station according to the embodiment 1 of the present invention.

FIG. 5A and FIG. 5B are sequence views for explaining operation of the base station and the mobile station according to the embodiment 1. As illustrated in FIG. 5A, in the first place, the base station transmits cells to the mobile station in order of the sequence number (SN) order from NO. 1. Since the cells of NO. 2, 3, 4, 5, 7, 8, 9, 10 are transmitted correctly, as illustrated in FIG. 5B, the mobile station returns the ACK signal to the base station while employing the reverse Cch.

Since error occurs on the cells of NO. 1 and NO. 6, as illustrated in FIG. 5A, the mobile station returns the NO. 1 cell with the error and the NO. 6 cell with the error as they are to the base station.

Since the NO. 1 cell is returned correctly, the base station performs error detection while comparing the received NO. 1 cell with a NO. 1 cell which is stored on the occasion of previous transmission. Further, the base station, as illustrated in FIG. 5B, transmits the error information (NO. 1 error information) to the mobile station while employing the forward Cch. On the other hand, since the NO. 6 cell, as illustrated in FIG. 5A, is returned incorrectly, the base station, as illustrated in FIG. 5B, requires such that the mobile station performs returning of the NO. 6 cell again while employing the NAK signal. In compliance with the requirement, the mobile station, as illustrated in FIG. 5A, performs returning of the NO. 6 cell again. Then, since the NO. 6 cell is returned correctly in accordance with the returning performed again, the base station performs error detection while comparing the received NO. 6 cell with a NO. 6 cell which is stored on the occasion of previous transmission. Then, the base station, as illustrated in FIG. 5B, transmits the error information (NO. 6 error information) to the mobile station while employing the forward Cch.

On the other hand, since the mobile station, as illustrated in FIG. 5B, cannot receive correctly the error information (the NO. 1 error information) of the NO. 1 cell, the mobile station requires retransmission of the error information (the NO. 1 error information) while employing the NAK signal. In compliance with this requirement, the base station, as illustrated in FIG. 5B, retransmits the error information (NO. 1 error information) of the NO. 1 cell.

As illustrated in FIG. 5B, since the error information (NO. 6 error information) of the NO. 6 cell is transmitted correctly, the mobile station corrects the NO. 6 cell with the error received previously on the basis of a position of an error bit indicated by the error information. Further, as illustrated in FIG. 5B, since the error information (NO. 1 error information) of the NO. 1 cell is transmitted correctly due to retransmission of the error information (NO. 1 error information) of the NO. 1 cell, the mobile station corrects the NO. 1 cell with the error received previously on the basis of a position of an error bit indicated by the error information.

According to operation as above, transmission of the cell which is performed while employing the forward Uch comes to an end with only one time per each cell. Further, on that particular case where an error occurs on the cell transmitted while employing the forward Uch, a returning of the cell with occurrence of the error is performed while employing the reverse Uch with small load assigned. Accordingly, since load of the forward channel with large communication load assigned is reduced, a value of a throughput becomes approximately 100% with a value of $E_b/N_o$ hardly related.

Further, since there is a little data quantity of the error information transmitted while employing the forward Cch, it is possible to prevent a decrease in the throughput of the forward channel.

Subsequently, a result of an improvement of the throughput of the forward channel in the case where the radio communication system of the present embodiment is employed is indicated in the following table 1. The table 1 is the throughput characteristic of the present embodiment in comparison with the SR-ARQ system. Further, the throughput value of the forward channel of the SR-ARQ system does not contain the cell that is retransmitted to the NAK from the mobile station.

TABLE 1

| $E_b/N_o$ | THROUGHPUT CHARACTERISTIC OF FORWARD CHANNEL | | IMPROVEMENT OF THROUGHPUT CHARACTERISTIC OF FORWARD CHANNEL | INCREASE OF TRAFFIC OF REVERSE CHANNEL |
|---|---|---|---|---|
| | SR-ARQ SYSTEM | PRESENT EMBODIMENT | | |
| 10 dB | 41.9% | ABOUT 100% | 58.1% | MAXIMUM 54.5% OF FORWARD THROUGHPUT |
| 15 dB | 88.4% | ABOUT 100% | 11.6% | MAXIMUM 6.3% OF FORWARD THROUGHPUT |

A following conclusion is obtained from the table 1.
IMPROVEMENT OF THROUGHPUT CHARACTERISTIC OF FORWARD CHANNEL:
   58.1% (Eb/NO=10 dB)
INCREASE OF TRAFFIC OF REVERSE CHANNEL:
   MAXIMUM 54.5% OF FORWARD THROUGHPUT (Eb/NO
   =10 dB)

Figure 6A:
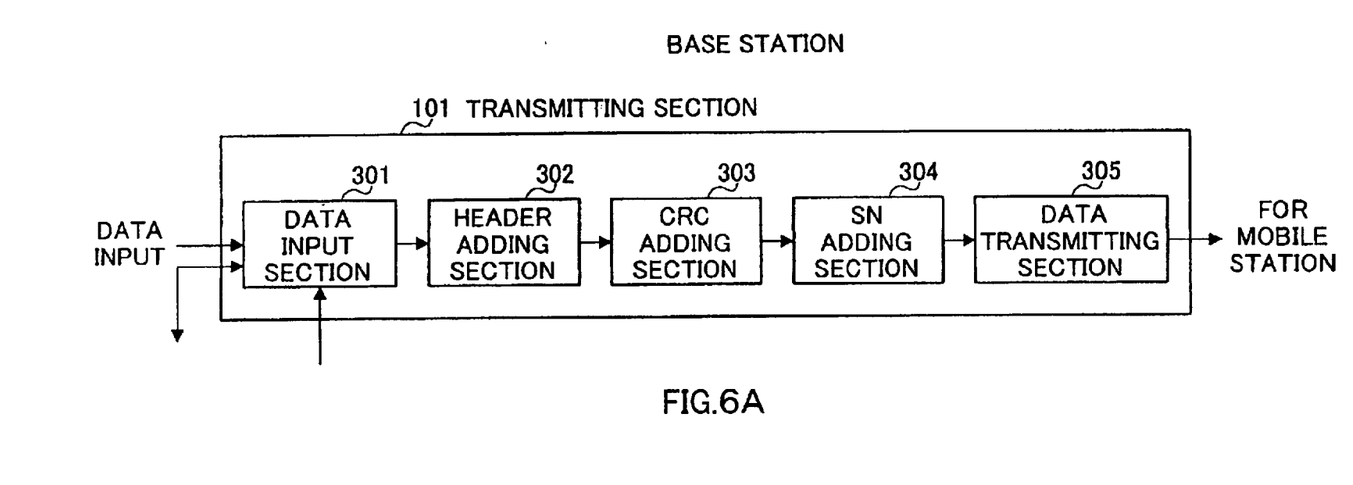
FIG. 6A is a block diagram illustrating a configuration of a transmitting section of the base station according to the embodiment 1 of the present invention.

Next, a configuration and operation of the transmitting section 101 of the base station side will be described specifically. FIG. 6A is a block diagram illustrating a configuration of the transmitting section 101 of the base station. In FIG. 6A, 301 is a data input section, 302 is a header adding section, 303 is a CRC adding section, 304 is a SN adding section and 305 is a data transmitting section.

Figure 6B:
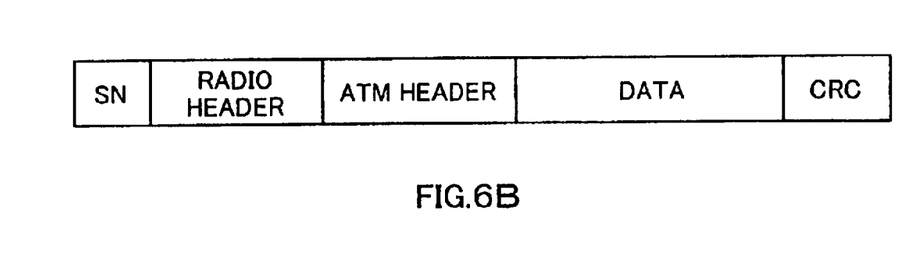
FIG. 6B is a view illustrating a configuration of a cell transmitted from the base station according to the embodiment 1 of the present invention.

In the header adding section 302, an ATM (Asynchronous Transfer Mode) cell header and a radio header are added to information data inputted to the data input section 301, followed by adding the CRC bit in the CRC adding section 303. In the SN adding section 304, a sequence number SN for warranting turn of the data is added to the information data as header control information, before being built into one cell. FIG. 6B illustrates the configuration of the built cell. The built cell is transmitted to the mobile station from the data transmitting section 305 while employing the forward Uch. Transmission of the cell with the forward Uch employed is performed only one time per one cell regardless of existence of an error. Accordingly, it is possible to reduce a communication load of the forward channel.

Figure 7:
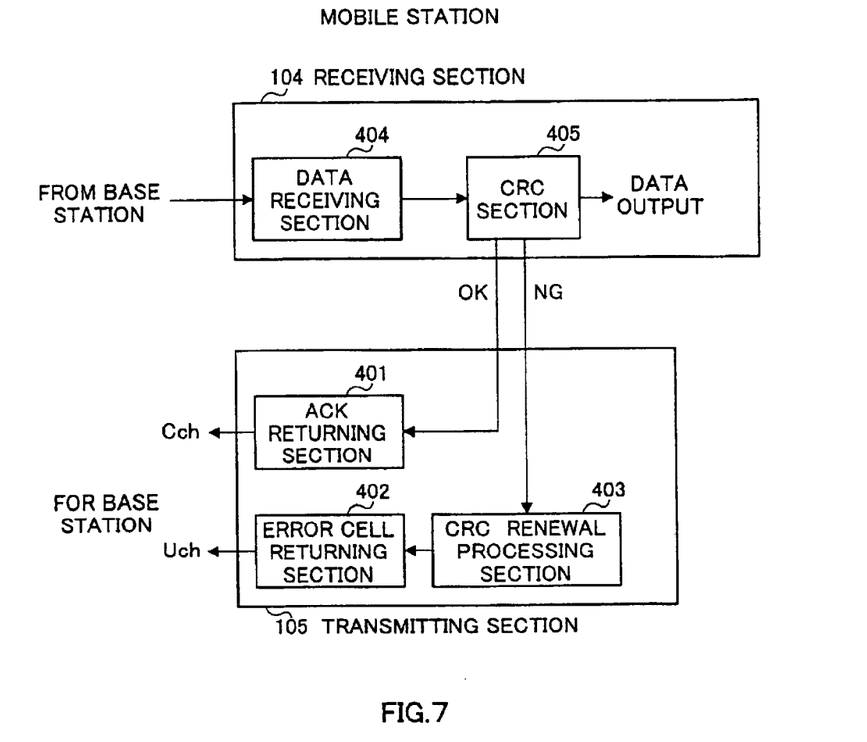
FIG. 7 is a block diagram illustrating a configuration of the mobile station according to the embodiment 1 of the present invention.

Next, a configuration and operation of the mobile station side will be described specifically. FIG. 7 is a block diagram illustrating a configuration of the mobile station. However, in FIG. 7, the same number is added to the same configuration as that of FIG. 4 to omit the description.

In FIG. 7, the receiving section 104 includes a data receiving section 404 and a CRC section 405. Further, the transmitting section 105 includes an ACK returning section 401, an error cell returning section 402, and a CRC renewal processing section 403.

Concerning the cell received by the data receiving section 404, in the first place, an error check is performed in the CRC section 405. The CRC section 405 performs error checking with respect to the cell in accordance with predetermined CRC method.

Further, in the case of no error on the cell, the CRC section 405 outputs a received cell to next processing section which is not illustrated. Then, an acknowledge signal ACK is replied to the base station by the ACK returning section 401 while employing reverse Cch.

On the other hand, in the case where an error exists, a CRC bit is added to a data portion of the received cell newly by the CRC renewal processing section 403. Then, an error cell is returned to the base station as it is by the error cell returning section 402 while employing the reverse Uch.

Thus, in the case where an error occurs on the cell on the occasion of transmission in the forward channel, since retransmission of the error cell is performed while employing the reverse channel with light load assigned, it is possible to reduce communication load of the forward channel. Further, the worse is the state of affairs of the forward propagation path, the larger is the improvement effect.

Figure 8:
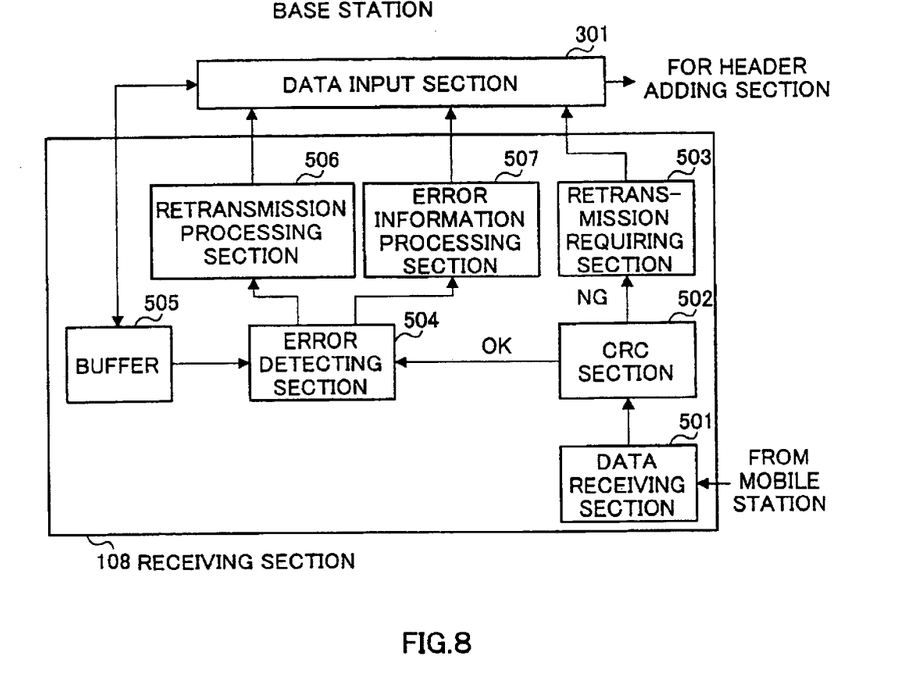
FIG. 8 is a block diagram illustrating a configuration of a receiving section of the base station according to the embodiment 1 of the present invention.

Next, a configuration and operation of the receiving section 108 of the base station side will be described specifically. FIG. 8 is a block diagram illustrating a configuration of the receiving section 108 of the base station side. However, in FIG. 8, the same number is added to the same configuration as that of FIG. 4 to omit the description.

In FIG. 8, 501 is a data receiving section, 502 is a CRC section, 503 is a retransmission requiring section, 504 is an error detecting section, 505 is a buffer for storing transmission data, 506 is a retransmission processing section and 507 is an error information processing section.

An error cell returned from the mobile station is received by the data receiving section 501. Then, the CRC section 502 performs CRC to the error cell. In the case where the error cell cannot be received correctly (namely, a result of the CRC becomes NG), the retransmission requiring section 503 requires retransmission of the error cell to the mobile station while employing the NAK signal. On the other hand, in the case where the error cell is received correctly (namely, a result of the CRC becomes OK), the error detecting section 504 compares the received error cell with a corresponding cell stored in the buffer 505 on the occasion of previous transmission, followed by detecting an occurrence position of the error and the number of occurrence of the error.

In the case where the number of occurrence of the error is smaller than the predetermined number, the error information processor 507 generates error information. Then, the transmitting section 101 transmits the error information to the mobile station while employing the forward Cch.

Figure 9:
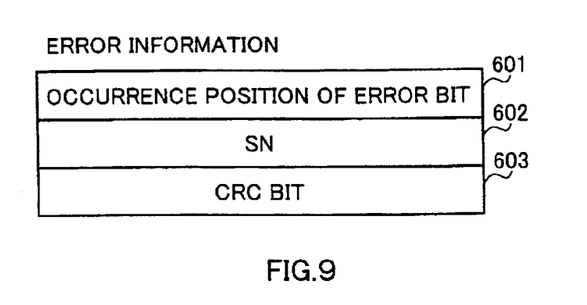
FIG. 9 is a view illustrating a configuration of error information transmitted from the base station according to the embodiment 1 of the present invention.

FIG. 9 illustrates a configuration of the error information. In FIG. 9, 601 is an occurrence position of an error bit, 602 is a sequence number SN and 603 is a CRC bit. The error information configured as above is transmitted to the mobile station while employing the forward Cch. The mobile station can find an occurrence position of the error within the error cell due to the occurrence position 601 of the error bit. Further, the mobile station can find whether the error information is one that is related to which cell due to the SN 602. Furthermore, the CRC bit 603 is employed for checking existence of the error that occurs during transmission of the error information in the mobile station. In the case where the error information takes such configuration, the error information requires 9 bits per one error.

Thus, in the case where the number of occurrence of the error is smaller than the predetermined number, since the error information with small data quantity is transmitted while employing the forward Cch, it is possible to reduce the communication load of the forward Uch.

On the other hand, in the case where the number of occurrence of the error is more than the predetermined number (for instance, the number of bits of the error information is quantity of more than corresponding one cell), the retransmission processing section 506 instructs to the data input section 301 so as to perform retransmission of the cell in stead of the fact that the error information is transmitted to the mobile station. In this case, the data input section 301 extracts a cell corresponding to the error cell from the buffer 505, followed by retransmitting the corresponding cell to the mobile station while employing the forward Uch. The mobile station rewrites the cell with the same SN due to a cell received newly.

Thus, in the case where the number of occurrence of the error is more than the predetermined number, namely, in the case where the number of occurrence of the error is exceedingly large, since retransmission of the error cell is performed while employing the forward Uch, it is possible to improve utilization efficiency of channel of the whole system. Further, since a probability that the number of occurrence of the error is extremely large is extremely small, there is a few decrease of the throughput of the forward channel due to retransmission of the cell in comparison with the state where the number of occurrence of the error is small.

Figure 10:
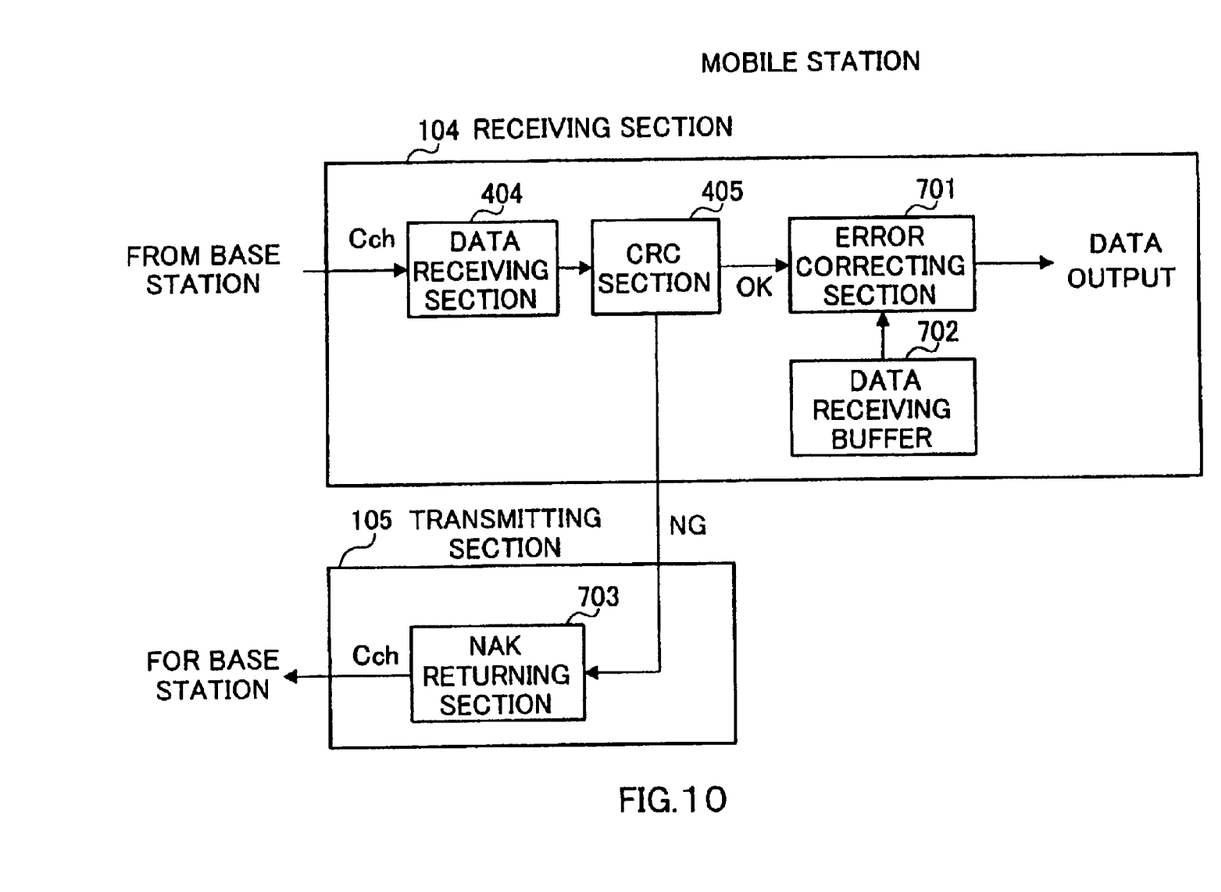
FIG. 10 is a block diagram illustrating a configuration of the mobile station according to the embodiment 1 of the present invention.

Next, operation of the mobile station will be described in the case where the mobile station receives the error information from the base station. FIG. 10 is a block diagram illustrating a configuration of the mobile station according to the embodiment 1 for performing correction of the error cell in accordance with the error information. However, in FIG. 10, the same number is added to the same configuration as that of FIG. 4 as well as FIG. 7 to omit the description.

In FIG. 10, 701 is an error correcting section, 702 is a data receiving buffer and 703 is a NAK returning section. The error information transmitted from the base station is received by the data receiving section 404, followed by performing an error check in the CRC section 405.

In a result of the error check, in the case where there is no error in the error information, the error correcting section 701 causes the error bit of corresponding error cell stored in the data receiving buffer 702 to be inverted in accordance with a position of the error bit indicated by the error information to correct the error of the error cell. Then, the error correcting section 701 outputs the corrected cell to a next processing section which is not illustrated.

In a result of the error check, in the case where the error exists in the error information, the NAK returning section 703 transmits the NAK signal to the base station to require retransmission of the error information to the base station.

Figure 11A:
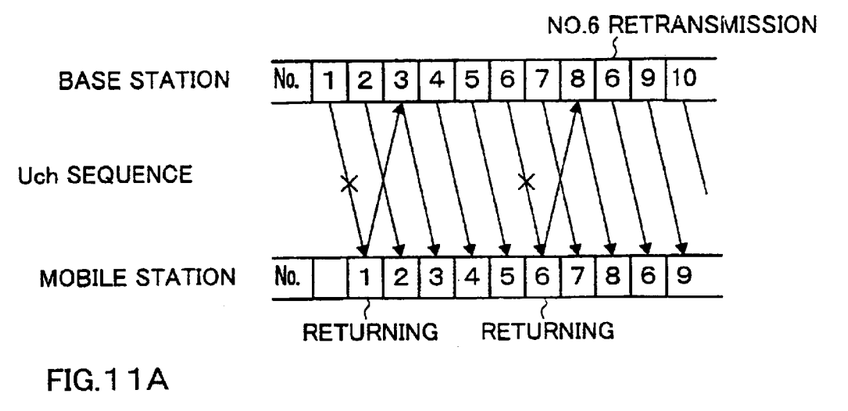
FIG. 11A is another sequence view for explaining operation of the base station and the mobile station according to the embodiment 1 of the present invention.
Figure 11B:
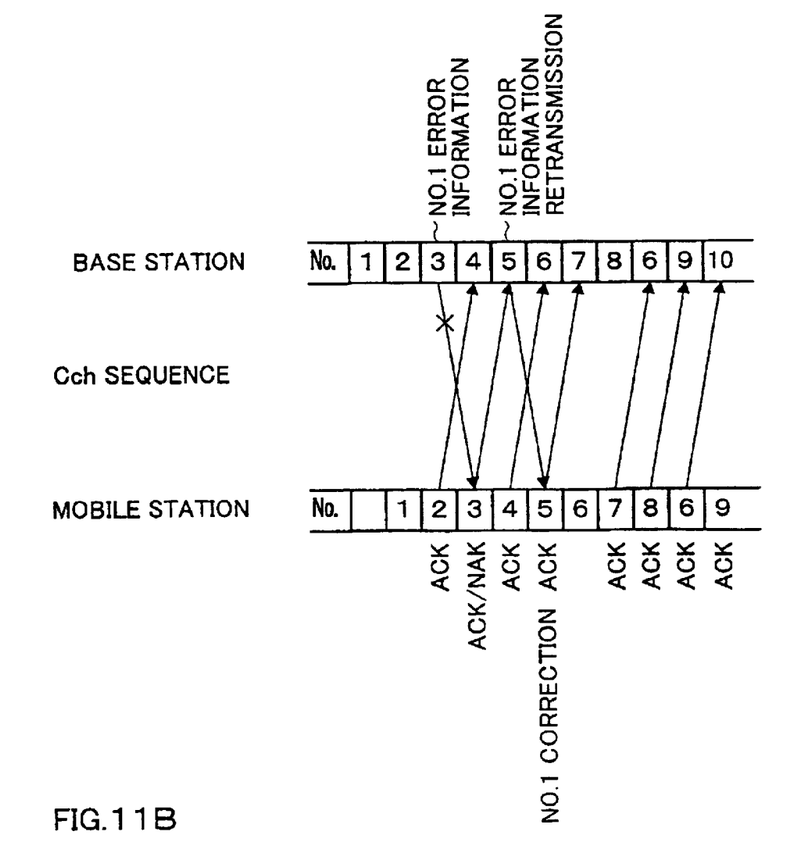
FIG. 11B is another sequence view for explaining operation of the base station and the mobile station according to the embodiment 1 of the present invention.

FIG. 11A and FIG. 11B are another sequence views for explaining operation of the base station and the mobile station according to the embodiment 1. As illustrated in FIG. 11A, in the first place, the base station transmits the cell to the mobile station in turn from NO. 1, in SN order. Since the cells of NO. 2, 3, 4, 5, 7, 8, 9 are transmitted correctly, as illustrated in FIG. 11B, the mobile station returns the ACK signal to the base station while employing the reverse Cch.

Since the error occurs in the cells of NO. 1 and NO. 6, as illustrated in FIG. 11A, the mobile station returns the NO. 1 cell with the error and the NO. 6 cell with the error to the base station as they are while employing the reverse Uch.

Since both of the NO. 1 cell and the NO. 6 cell are returned correctly, the base station compares the received NO. 1 cell and NO. 6 cell with the NO. 1 cell and the NO. 6 cell stored on the occasion of previous transmission respectively, followed by performing detection of the error. Here, for instance, in the case where the number of occurrence of the error in the NO. 1 cell is smaller than the predetermined number, as illustrated in FIG. 11B, the base station transmits error information (NO. 1 error information) indicating occurrence position of an error to the mobile station while employing the forward Cch. Further, for instance, in the case where the number of occurrence of the error in the NO. 6 is more than the predetermined number, namely in the case where the number of occurrence of the error is extremely large, as illustrated in FIG. 11A, the base station performs retransmission of the NO. 6 cell while employing the forward Uch in stead of transmission of the error information.

Then, since the retransmitted NO. 6 cell is transmitted correctly, the mobile station, as illustrated in FIG. 11B, returns the ACK signal to the base station. Moreover, since the error information (NO. 1 error information) of the NO. 1 cell is not transmitted correctly, the mobile station requires retransmission of the error information (NO. 1 error information) to the base station while employing the NAK signal. In compliance with this requirement, the base station, as illustrated in FIG. 11B, retransmits the error information (NO. 1 error information) of the NO. 1 cell to the mobile station.

Then, since the retransmitted error information (NO. 1 error information) of the NO. 1 cell is transmitted correctly, the mobile station corrects the NO. 1 cell with the error received previously on the basis of a position of the error bit indicated by the error information.

As described above, according to the present embodiment, it is possible to decrease communication load of the forward channel with large communication load assigned.

Embodiment 2

Figure 12:
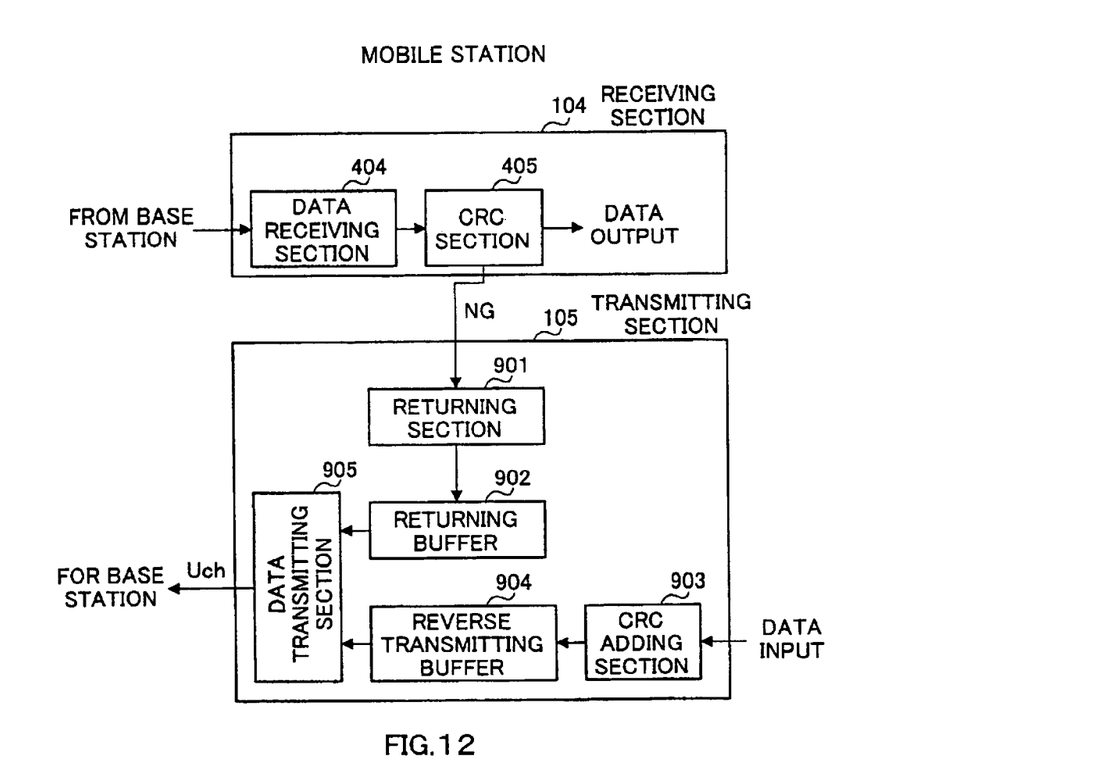
FIG. 12 is a block diagram illustrating a configuration of a mobile station according to an embodiment 2 of the present invention.

FIG. 12 is a block diagram illustrating a configuration of the mobile station according to an embodiment 2 of the present invention. Further, in FIG. 12, the same number is added to the same configuration as that of FIG. 4 and FIG. 7 to omit the description.

In FIG. 12, 901 is a returning section, 902 is a returning buffer, 903 is a CRC adding section, 904 is a reverse transmission buffer and 905 is a data transmitting section. Concerning a cell received by the data receiving section 404, in the first place, an error check is performed in the CRC section 405. In the case where an error exists, the returning section 901 performs returning processing. The cell results in a condition for waiting transmission in the returning buffer 902.

On the other hand, data transmitted from the mobile station, to which the CRC bit is added in the CRC adding section 903, results in a condition for waiting transmission in the reverse transmitting buffer 904.

The data transmitting section 905 refers to the reverse transmitting buffer 904 on the occasion of transmission of the data. The data transmitting section 905, in the case where transmitted information data is stored in the reverse transmitting buffer 904, transmits the information data stored in the reverse transmitting buffer 904 while taking precedence over returning of the cell with an error stored in the returning buffer 902. Then, when the information data stored in the reverse transmitting buffer 904 is over, the data transmitting section 905 returns the error cell stored in the returning buffer 902.

As described above, according to the present embodiment, since returning of the error cell is performed only in the case where there is room in a traffic of the reverse Uch, it is possible to return the error cell without influencing transmission of the information data.

Further, in the embodiment 1 and the embodiment 2, as one example, there is described on the assumption that the ATM cell form is employed as the form of the information data. However, the form of the employed information data is not limited to the ATM cell form. It does not matter whether the form of the information is a packet or so forth.

As described above, according to the present invention, transmission of the cell performed while employing the forward Uch ends by only one time per each cell. Further, returning of the cell with the error occurrence is performed while employing the reverse Uch with small load assigned on that particular case where an error occurs in the cell transmitted while employing the forward Uch. Consequently, according to the present invention, since the throughput becomes about 100% in the context with a value of $E_b/N_o$ hardly related, the load of the forward channel whose communication load is large is reduced.

Further, according to the present invention, since the error information transmitted while employing the forward Cch has a small amount of data quantity, it is possible to prevent decrease of the throughput of the forward channel.

Consequently, according to the present invention, since it is possible to alleviate load of the forward channel with large load assigned, it is possible to perform asymmetrical data transmission with excellent efficiency.

This application is based on the Japanese Patent Application No. HEI 11-94351 filed on Mar. 31, 1999 and the Japanese Patent Application No. HEI 11-102734 filed on Apr. 9, 1999, entire contents of which are expressly incorporated by reference herein.

INDUSTRIAL APPLICABILITY

The present invention is applicable to a base station apparatus that is employed in a radio communication system, and to a communication terminal apparatus such as a mobile station for performing radio communication to the base station apparatus.

What is claimed is:

1. A communication terminal apparatus in a radio communication system performing asymmetrical communication, whereby a load on a downlink channel is heavier than a load on an uplink channel, the communication terminal apparatus comprising:

a receiver that receives, via the downlink channel: (i) a transmission unit comprising information data and (ii) position information, indicating a position of an error bit, that comprises fewer bits than the transmission unit;

a checker that checks for one or more errors in the received transmission unit and the received position information; and a transmitter that transmits:
(a) the received transmission unit to a base station apparatus via the uplink channel, in the event that an error is detected in the received transmission unit, and
(b) a retransmission request for the position information to the base station apparatus via the uplink channel, in the event that an error is detected in the received position information.

2. The communication terminal apparatus according to claim 1, wherein the receiver receives the transmission unit only once via the downlink channel, regardless of whether an error occurs in the downlink channel.

3. The communication terminal apparatus according to claim 1, wherein in the event that an error is detected in the received transmission unit, the transmitter transmits the received transmission unit to the base station apparatus only once via the uplink channel and, thereafter, does not transmit the received transmission unit but, instead, transmits the retransmission request for the position information to the base station apparatus via the uplink channel until no error is detected in the received position information.

4. The communication terminal apparatus according to claim 1, wherein the transmitter transmits the received transmission unit having the detected error, in the event that there is no information data to be transmitted to the base station apparatus.

5. The communication, terminal apparatus according to claim 1, further comprising a corrector that corrects the error detected in the received transmission unit, in the event that no error is detected in the received position information, in accordance with the received position information.

* * * * *